United States Patent [19]

Haber et al.

[11] 4,182,737
[45] Jan. 8, 1980

[54] MOLDING OF A SHOCK RESISTANT TRANSPARENT POLYMER SPHERE

[75] Inventors: Terry M. Haber, Costa Mesa; Marlin D. Fernandez, Bloomington, both of Calif.

[73] Assignee: Joseph L. Fernandez, Bloomington, Calif.

[21] Appl. No.: 935,464

[22] Filed: Aug. 21, 1978

Related U.S. Application Data

[62] Division of Ser. No. 857,297, Dec. 5, 1977.

[51] Int. Cl.² .......................... B29C 17/12; B29C 6/02
[52] U.S. Cl. .................................... 264/135; 264/132; 264/162; 264/262; 264/275; 264/277
[58] Field of Search ............... 264/161, 162, 262, 275, 264/277, 278, 132, 134, 135; 273/59 R

[56] References Cited

U.S. PATENT DOCUMENTS

| | | | |
|---|---|---|---|
| 3,046,013 | 7/1962 | Kutik | 264/277 |
| 3,340,342 | 9/1967 | Kane et al. | 264/275 |
| 3,344,468 | 10/1967 | Moslo | 264/275 |
| 3,426,121 | 2/1969 | Faulkner | 264/275 |
| 3,439,917 | 4/1969 | Gentile | 264/275 |
| 4,116,439 | 9/1978 | Chavarria | 264/245 |

Primary Examiner—James B. Lowe
Attorney, Agent, or Firm—Ralph B. Pastoriza

[57] ABSTRACT

An example of the shock resistant transparent polymer sphere is a billiard or pool ball. The molding apparatus includes lower and upper mold halves defining juxtaposed concave hemispherical surfaces to define a spherical mold cavity with a top fill opening on the upper mold half. Interlocking of the mold halves together is accomplished by tongue and window structures circumferentially spaced about the meeting points of the two halves at 120°. A holder in the form of an annular ring is provided for supporting a central disc provided with a symbol on each of its opposite faces. The design is such that the ring when positioned in the spherical cavity defined by the mold halves supports the disc with its center coincident with the center of the spherical cavity. The molded sphere is made by a single pouring operation of resin through the fill opening, the disc and ring being encapsulated within the sphere. The composition of the resulting product is such that a bonding takes place between the disc, ring and resin material for the sphere resulting in a final sphere in which shock is absorbed by the disc, supporting ring, ink utilized in forming the symbol on the opposite faces of the disc as well as the resin as though the entire sphere were homogeneous throughout.

2 Claims, 5 Drawing Figures

U.S. Patent
Jan. 8, 1980
4,182,737
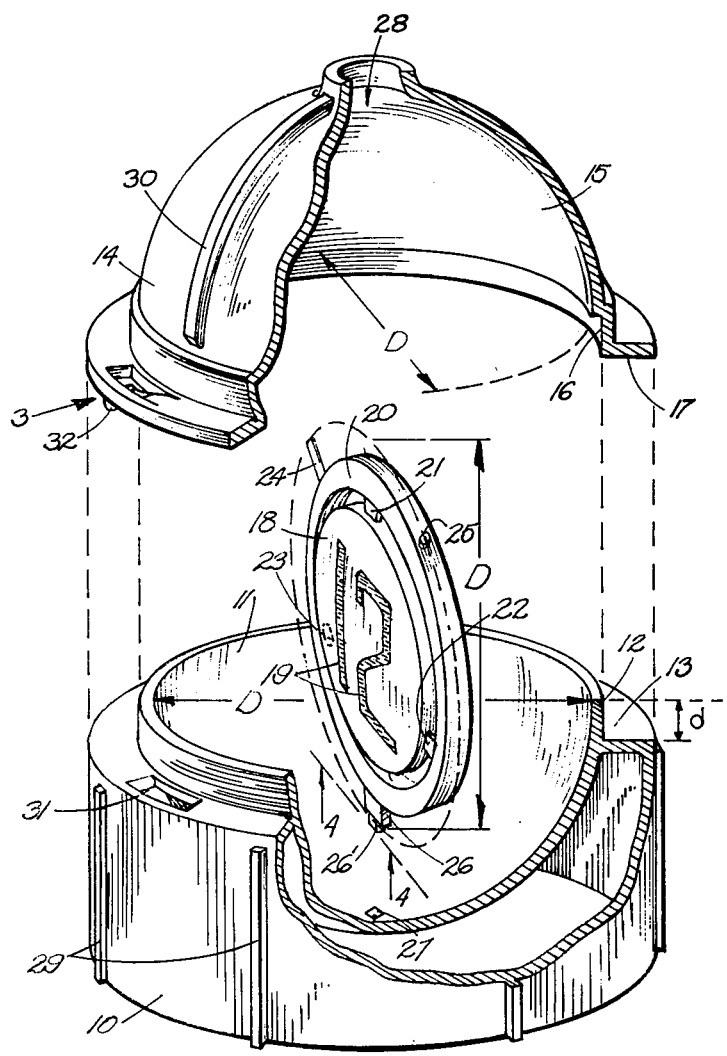
Fig 1
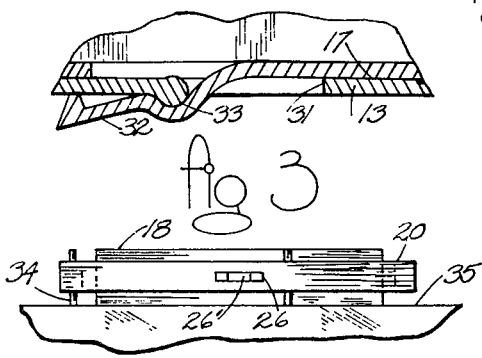
Fig 3
Fig 4
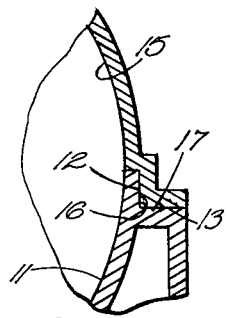
Fig 2
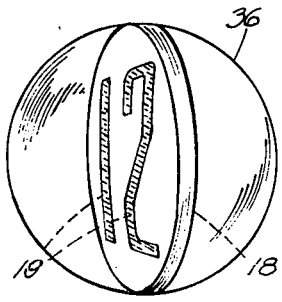
Fig 5

MOLDING OF A SHOCK RESISTANT TRANSPARENT POLYMER SPHERE

This is a division of application Ser. No. 857,297 filed Dec. 5, 1977.

This invention relates to a molding apparatus, method and product composition for providing shock resistant transparent polymer spheres useful, by way of example, as pool or billiard balls.

BACKGROUND OF THE INVENTION

Spherical objects utilized in games such as pool or billiards are normally homogeneous throughout so that the shock of impact will be thoroughly, uniformly absorbed throughout the entire mass of the ball. In the case of a pool ball, a number designation identifying the ball is provided on one or more surface portions of the ball, the balls themselves normally being opaque.

A very attractive type of pool ball would result if a transparent material could be used in molding the ball. In such instances, however, provision of a designating numeral on the surface would interrupt the transparent feature of the ball and it would be preferable if the designating numeral could someway be incorporated or encapsulated within the ball.

It is already known to provide a transparent bowling ball encapsulating geometric designs to enhance and provide a novel appearance for the bowling ball. In this respect, reference is had to U.S. Pat. No. 3,207,514 to Vickery claiming such a structure. However, so far as we are aware, there has never heretofore been produced a transparent pool or billiard ball incorporating an appropriate number designation until the invention of Robert James Chavarria and Clark Berg Foster as disclosed and claimed in copending patent application Ser. No. 728,498 filed Sept. 28, 1976, now U.S. Pat. No. 4,116,439, and entitled POOL BALL.

The foregoing application discloses molding apparatus, a molding method, and a completed transparent pool ball product. Nevertheless, effective bonding between the incorporated numeral carrier in the sphere and the sphere material itself as well as the ink or other means for providing a numeral or symbol has not always been assured. As a consequence, shattering of the ball along cleavage planes where improper bonding occurs can result. Moreover, surface deterioration and imperfections are difficult to avoid.

BRIEF DESCRIPTION OF THE PRESENT INVENTION

Bearing the foregoing in mind, the present invention contemplates an improved molding apparatus, method and product composition for providing shock resistant transparent polymer spheres such as pool balls and in its preferred embodiment is specifically concerned with the formation of transparent pool balls encapsulating an appropriate opaque disc having a numeral designation on its opposite faces to identify the ball.

Essentially, this improved invention, as a consequence of the molding apparatus, method and composition employed provides a vastly improved pool ball wherein impact shocks are absorbed by the resin of the ball as well as the encapsulated materials in the ball all the same as though a homogeneous ball were provided. Further, the molding apparatus and method of molding and the compositions employed in accord with this invention assure bonding of the encapsulated portions with the resin of the sphere in such a manner as to minimize the risk of any cleavage planes which would result in shattering of the ball upon impact.

BRIEF DESCRIPTION OF THE DRAWINGS

A complete understanding of this invention as well as many other features and advantages resulting therefrom will be had by now referring to the accompanying drawings in which:

FIG. 1 is an exploded perspective view with portions cut away of a molding apparatus in accord with this invention;

FIG. 2 is a fragmentary cross section of a portion of the structure of FIG. 1 when in assembled relationship;

FIG. 3 is another fragmentary cross section of the assembled structure of FIG. 1 looking in the direction of the arrow 3;

FIG. 4 is a side elevational view of a disc-ring assembly shown in FIG. 1 for encapsulation; and, FIG. 5 is a perspective view of a finished pool ball product formed in accord with the method and apparatus of the invention.

DETAILED DESCRIPTION OF THE PREFERRED EMBODIMENT

Referring to FIG. 1, the molding apparatus itself includes a lower mold half 10 defining an upwardly facing concave hemispherical surface 11. The upper exterior marginal wall of the surface 11 is cylindrical as shown at 12 for a given vertical distance downwardly, this surface thence extending laterally outwardly to define a flat annular upwardly facing shoulder 13.

An upper mold half 14 defines a downwardly facing concave hemispherical surface 15. The lower interior wall of this surface has an increased diameter portion at the lower edge of said downwardly facing concave hemispherical surface defining an interior cylindrical wall 16 extending downwardly beyond the edge the same given vertical distance as the exterior wall 12 of the lower mold half. The interior cylindrical wall 16 thence extends laterally to define a flat annular downwardly facing shoulder 17 for seating on the upwardly facing shoulder 13 when the external marginal wall 12 is received in the internal cylindrical wall 16 so that the upwardly facing and downwardly facing concave hemispherical surfaces are juxtaposed to define a spherical cavity.

Referring to the central portion of FIG. 1, there is shown a disc 18 provided with a symbol 19 on each of its opposite faces. In the embodiment disclosed, this symbol constitutes the numeral 12 and serves to identify a pool ball within which the disc will ultimately be encapsulated.

The disc 18 is diametrically held in the spherical cavity of the mold so that its center coincides with the center of the spherical cavity. Towards this end, there is provided a holder for the disc in the form of an annular ring 20 having a plurality of lugs 21, 22 and 23 extending radially inwardly equal distances to engage the periphery of the disc 18 at equal circumferentially spaced points. The disc is thus held inside the ring in substantially coplanar relationship.

The exterior of the ring includes at least two locating pins 24 and 25 extending radially outwardly, and a centering projection 26 shown at the bottom of the ring 20. The pins and centering projection are spaced at 120°, the bottom-most point on the upwardly facing hemispherical surface having a hole 27 receiving the end portion of the centering projection 26'.

The diameter of the holder as measured out to the tips of the pins and the start of the end portion of the centering projection 26 is indicated at D and is substantially the same as the diameter of the hemispherical surface also designated by the same letter D in FIG. 1.

With the foregoing arrangement, the disc 18 will necessarily be held in a diametric position within the spherical cavity defined by the juxtaposed hemispherical surfaces 11 and 15 of the lower and upper mold halves respectively, the centering projection 26 having its end portion 26' received in the central bottom opening 27 of the lower mold half 11 and the locating pins 24 and 25 touching lightly the downwardly facing hemispherical surface 15.

The top center of the upper mold half 14 includes a fill opening 28 for introducing molding material. The exterior walls of the lower and upper mold halves further may be provided with gripping lands or ribs as indicated at 29 and 30 respectively. In this respect, the flat upwardly facing annular shoulder 13 and the flat downwardly facing annular shoulder 17 include cooperating fastening means for holding the mold halves together, this fastening means being responsive to relative twisting of one mold half with respect to the other. The provision of the lands or ribs on the exterior of the mold halves facilitates this manual twisting to lock the halves together or to release the halves.

The foregoing mentioned cooperating fastening means in the specific embodiment shown includes three windows on the flat upwardly facing annular shoulder 13 spaced 120° from each other. Only one of these windows is visible as indicated at 31 in FIG. 1. The flat downwardly facing annular shoulder 17 in turn is provided with three flexible tongues extending at an acute angle to the shoulder receivable in the windows, when the upper mold is rotated in the direction of extension of the tongues relative to the lower mold half. Only one of these tongues is visible at 32 in FIG. 3.

The foregoing locking feature can better be understood by now referring to FIGS. 2 and 3. FIG. 2 illustrates the seating of the lower and upper annular shoulders 13 and 17 and it will be understood that when positioning the upper mold half on the lower mold half, the tongues 32 are indexed to enter the windows 31.

FIG. 3 illustrates the relative positions of the tongue and windows after the same have been received through the window and the upper mold half twisted relative to the lower mold half in a clockwise direction as viewed from the top. It will be evident that the tongue 32 has been locked under an edge of the window 31. In this respect, curved cooperating camming surfaces are provided as indicated at 33 for holding the tongues in their final positions within the windows. Thus, the edge portion of the window 31 under which the tongue 32 slides is provided with an enlarged rounded cross section as shown in FIG. 3, the tongue 32 itself having a depressed or curved portion for receiving this rounded portion when the tongue is wholly disposed beneath the edge of the window thus providing an indexing or locking of the mold halves together. When the upper mold half is to be removed from the lower mold half, a twist in the opposite direction will result in a camming down of the tongue 32 by the rounded portion 33 so that release of the tongue through the window can take place.

In the description of the disc 18 and holding ring 20 in FIG. 1, it will be recalled that the disc 18 was described as being substantially coplanar with the ring 20. To effect this coplanar relationship, it is necessary that the medial plane of the disc 18 coincide with the medial plane of the ring 20. The ring 20 itself has a thickness which is less than the thickness of the disc 18 and thus for proper centering, the opposite faces or surfaces of the disc 18 must extend equal distances beyond the opposite faces of the annular ring 20.

To assure the above described proper positioning of the disc relative to the ring, reference is had to FIG. 4 wherein it will be noted that the ring includes axially extending nubs from its opposite flat surfaces, one such nub being indicated at 34 in FIG. 4. These nubs terminate in the plane of the opposite surfaces of the disc when the disc is centered in the ring. Accordingly, proper axial centering of the disc in the ring can be effected by engaging a flat surface indicated at 35 in FIG. 4 with one surface of the disc and the corresponding ends of the nubs 34.

The method of manufacturing a shock resistant transparent polymer sphere such as a pool ball with a disc having a symbol inked on each of its opposite faces diametrically incorporated in the sphere with the center of gravity of the disc coincident with the center of gravity of the sphere utilizing the molding apparatus of FIGS. 1–4 will now be described.

First, a mold is provided defining a spherical cavity with a single fill opening at its top. This spherical cavity may be provided by the mold halves shown in FIG. 1.

A given transparent polyester resin in uncured liquid form is then provided preparatory to pouring into the mold. One type of polyester resin is identified as "Clear Cast" manufactured by Fiberlay, Inc. of Seattle, Wash. This resin is preferably mixed with an appropriate catalyst to harden the resin after pouring. Such a catalyst is identified by "P-102" manufactured by the same company as "Clear Cast." Additionally, a "surface seal" may be added to the mixture to avoid a tacky surface upon hardening. The resin involved has a given index of refraction and a given density after curing.

The method then includes the steps of providing an opaque disc such as the disc 18 of FIG. 1 of thermoplastic material having substantially the same density as the above referred-to given density but constituting a plastic different from the polyester resin. The material of the disc has the characteristics of mechanically and chemically bonding with the resin without any surface deterioration. Further, this material has the property of swelling slightly on extended contact with the polyester resin.

A holder corresponding to the annular ring 20 described in FIG. 1 is then provided and constitutes a thermoplastic material which will mechanically and chemically bond with the polyester resin. The thermoplastic material of the ring has the same index of refraction, transparency, Rockwell hardness and surface finishing characteristics as the polyester resin.

In order to provide the symbol or numeral designation on the opposite faces of the disc, there is provided an ink constituting a polyester and thermoplastic alloy which further functions as a catalyst for the polyester resin and will bond to both the disc and the resin. This ink is silk-screened on each of the opposite faces of the disc by an appropriate mask defining the numeral 12 in the particular example set forth.

The disc is positioned in central coplanar relationship in the ring with the ring lugs described in FIG. 1 engaging the periphery of the disc at equal circumferentially spaced points to hold it centered and provide a disc-ring assembly.

This disc-ring assembly is then positioned in the spherical cavity of the mold so that the center of the disc coincides with the center of the spherical cavity.

Next, the polyester resin is poured into the fill opening 28 to completely fill the cavity and thereby encapsulate this disc-ring assembly. Care must be taken to pour the resin in carefully and slowly to avoid any possible entrapment of air bubbles. Essentially, however, there is only necessary a single pouring operation.

After the resin has cured with the disc-ring assembly encapsulated therein, the ring is substantially invisible. The cured sphere can then be removed from the mold by separating the mold halves in the event a mold of the type described in FIG. 1 is employed.

Final steps of the method involve polishing the surface of the resulting sphere to provide the completed transparent polymer sphere.

It will be recalled that a characteristic of the thermoplastic material comprising the disc is that it swells slightly upon extended contact with the polyester resin. Bonding of the disc and ink to each other and to the polyester resin thus results in an embossed characteristic for the symbols, the uncovered surface portions of the disc swelling slightly. The further bonding of the ring with the disc and resin results in a final sphere in which shock impacts are absorbed by the disc, ink and ring as well as the resin as though the entire sphere were homogeneous throughout.

The foregoing bonding characteristics of all of the components making up the finalized pool ball minimize any risk of shattering of the ball upon impact because of the uniform absorption of shock by the bonded constituents. In other words, there are no "cleavage planes" which could cause such shattering. Moreover, the bonding of the disc with the polyester resin is effected without any surface deterioration and a minimization of any visible imperfections.

FIG. 5 illustrates the final product composition which, in the particular embodiment described, constitutes a pool ball identified by the numeral 12. While the actual diameter of the disc 18 is less than the outside diameter of the completed sphere, the disc will nevertheless appear to be of the same diameter because of the optical magnification accorded by the hemispherical clear resin portions on opposite sides of the disc.

The resulting transparent pool ball has many advantages in actual play. The rotational axis, for example, can immediately be identified by observing the rotation of the disc when the ball is impelled by a cue ball. This latter feature is important in controlling the amount of "English" applied to the ball.

The weight of the ball illustrated in FIG. 5 is 117 grams plus or minus three grams. This weight or mass is less than that of a conventional pool ball but results in a more "lively" action of the ball; for example, better rebound and less moment of inertia. The diameter of the ball corresponds to conventional pool balls and is equal to 57 millimeters plus or minus 1 millimeter.

From all of the foregoing, it will be appreciated that the present invention provides a greatly improved shock .resistant transparent polymer sphere molding apparatus, method and product composition particularly useful in the provision of pool balls.

We claim:

1. A method of manufacturing a shock resistant transparent polymer sphere with a disc, having a symbol inked on each of its opposite faces, diametrically incorporated in the sphere with the center of gravity of the disc coincident with the center of gravity of the sphere, including the steps of:
   (a) providing a mold defining a spherical cavity with a single fill opening at its top;
   (b) providing a given transparent polyester resin in liquid form preparatory to pouring into said mold, said resin having a given index of refraction and a given density after curing;
   (c) providing an opaque disc of thermoplastic material having substantially the same density as said given density but constituting a plastic different from said polyester resin, said material having the characteristics of mechanically and chemically bonding with said resin without any surface deterioration and which material swells slightly upon extended contact with said polyester resin;
   (d) providing an ink constituting a polyester and thermoplastic alloy which will function as a catalyst for said thermoplastic resin and will bind to both said disc and said resin;
   (e) providing a holder in the form of an annular ring having a plurality of equally circumferentially spaced lugs extending radially inwardly equal distances, said ring being of thermoplastic material which will mechanically and chemically bond with said polyester resin, and which has the same index of refraction, transparency, Rockwell hardness and surface finishing characteristics as said polyester resin after curing;
   (f) silk-screening said symbol on each of the opposite sides of said disc with said ink;
   (g) positioning said disc in central coplanar relationship in said ring, said lugs engaging the periphery of said disc at equal circumferentially spaced points to hold it centered to provide a disc-ring assembly;
   (h) positioning said disc-ring assembly in said spherical cavity of said mold so that the center of said disc coincides with the center of said spherical cavity;
   (i) pouring said resin into said fill opening to completely fill said cavity and thereby encapsulate said disc-ring assembly;
   (j) removing the polyester resin with said disc-ring assembly encapsulated therein after curing, said ring being substantially invisible; and
   (k) polishing the surface of the resulting sphere to provide said shock resistant transparent polymer sphere, the bonding of the disc and ink to each other and to the polyester resin resulting in an embossed characteristic for the symbols as a result of said slight swelling of the disc material and the further bonding of the ring with the disc and resin resulting in a sphere in which shock is absorbed by the disc, ink and ring as well as the resin as though the entire sphere were homogeneous throughout.

2. A method of manufacturing a shock resistant transparent polymer sphere with a disc, having a symbol on each of its opposite faces, diametrically incorporated in the sphere with the center of gravity of the disc coincident with the center of gravity of the sphere, including the steps of:
   (a) providing a mold defining a spherical cavity with a single fill opening at its top;

(b) providing a given transparent polyester resin in liquid form preparatory to pouring into said mold, said resin having a given index of refraction and a given density after curing;

(c) providing an opaque disc of thermoplastic material having substantially the same density as said given density but constituting a plastic different from said polyester resin, said material having the characteristics of mechanically and chemically bonding with said resin without any surface deterioration and which material swells slightly upon extended contact with said polyester resin;

(d) providing a holder in the form of an annular ring having a plurality of equally circumferentially spaced lugs extending radially inwardly equal distances, said ring being of thermoplastic material which will mechanically and chemically bond with said polyester resin, and which has the same index of refraction, transparency, Rockwell hardness, specific gravity and surface finishing characteristics as said polyester resin after curing;

(e) providing said symbol on each of the opposite sides of said disc;

(f) positioning said disc in central coplanar relationship in said ring, said lugs engaging the periphery of said disc at equal circumferentially spaced points to hold it centered to provide a disc-ring assembly;

(g) positioning said disc-ring assembly in said spherical cavity of said mold so that the center of said disc coincides with the center of said spherical cavity;

(h) pouring said resin into said fill opening to completely fill said cavity and thereby encapsulate said disc-ring assembly;

(i) removing the polyester resin with said disc-ring assembly encapsulated therein after curing, said ring being substantially invisible; and (j) polishing the surface of the resulting sphere to provide said shock resistant transparent polymer sphere, the bonding of the disc to the polyester resin resulting in an embossed characteristic for the symbols as a result of said slight swelling of the disc material and the further bonding of the ring with the disc and resin resulting in a sphere in which shock is absorbed by the disc and ring as well as the resin as though the entire sphere were homogenous throughout.

* * * * *